United States Patent
Shih et al.

(10) Patent No.: US 7,424,271 B2
(45) Date of Patent: Sep. 9, 2008

(54) MULTI-MODE AND MULTI-BAND RF TRANSCEIVER AND RELATED COMMUNICATIONS METHOD

(75) Inventors: Did-Min Shih, Milpitas, CA (US); Jyh-Fong Lin, Hsin-Tien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 371 days.

(21) Appl. No.: 10/904,895

(22) Filed: Dec. 2, 2004

(65) Prior Publication Data

US 2005/0124377 A1 Jun. 9, 2005

Related U.S. Application Data

(60) Provisional application No. 60/481,737, filed on Dec. 4, 2003.

(51) Int. Cl.
H04B 1/40 (2006.01)
(52) U.S. Cl. .............. 455/76; 455/552.1; 455/127.4; 455/78; 455/553.1; 455/165.1
(58) Field of Classification Search .......... 455/552.1, 455/127.4, 553.1, 75, 127.1, 265, 258, 86, 455/324, 150.1, 76, 78, 165.1
See application file for complete search history.

(56) References Cited

U.S. PATENT DOCUMENTS 5,896,562 A * 4/1999 Heinonen .................. 455/76
6,011,815 A * 1/2000 Eriksson et al. ............. 375/296
6,566,964 B1 * 5/2003 Hirano ..................... 331/1 A
6,912,376 B1 * 6/2005 Smith et al. ................ 455/77
7,092,676 B2 * 8/2006 Abdelgany et al. .......... 455/76
2002/0039894 A1 * 4/2002 Yoshida et al. ............. 455/265
2003/0062959 A1 * 4/2003 Tsuda et al. ................ 331/17
2003/0078011 A1 * 4/2003 Cheng et al. ............... 455/73
2003/0118143 A1 * 6/2003 Bellaouar et al. ........... 375/376
2003/0139148 A1 * 7/2003 Damgaard et al. ........... 455/86
2004/0106380 A1 * 6/2004 Vassiliou et al. ............ 455/73

* cited by examiner

*Primary Examiner*—Lana N. Le
*Assistant Examiner*—Ping Y Hsieh
(74) *Attorney, Agent, or Firm*—Winston Hsu

(57) ABSTRACT

A multimode communications system includes a first communications module, a transmission module, a switch and a second communications module. The first communication module has a frequency modulator for modulating a dividing ratio to adjust an oscillating signal and selectively enabling the oscillating signal to have its frequency change with a variety of contents of a first communications signal by modulating the dividing ratio according to the contents of the first communications signal on a modulating mode or enabling the oscillating signal to have its frequency constant by keeping the dividing ratio unchanged. The switch is to selectively transmit the oscillating signal either to the transmission module when the frequency modulator is operating on the modulating mode or to a receiving end when the frequency modulator is operating on the constant frequency mode.

12 Claims, 7 Drawing Sheets

MULTI-MODE AND MULTI-BAND RF TRANSCEIVER AND RELATED COMMUNICATIONS METHOD

CROSS REFERENCE TO RELATED APPLICATIONS

This application claims the benefit of U.S. provisional Application No. 60/481,737, which was filed on Dec. 4, 2003 and is included herein by reference.

BACKGROUND OF INVENTION

1. Field of the Invention

The present invention relates to an RF transceiver, and more particularly, to a multi-mode & multi-band RF transceiver, like a GSM/EDGE & WCDMA dual-mode & multi-band cellular phone, and related communications method.

2. Description of the Prior Art

The past decade has shown an explosive growth in wireless communications systems. A variety of communications systems, such as GSM and CDMA, have been introduced to the market of cell phones to realize wireless communications functions. A cell phone comprises a wireless RF transceiver to transmit/receive wireless signals. An RF transceiver usually comprises a phase-locked loop (PLL) as a frequency synthesizer to generate a carrier signal for a local oscillator (LO).

In general, a typical multi-mode or multi-band RF transceiver has to comprise more than one LO, and more than one PLL accordingly, to generate more than one carrier signal for a variety of bands or system modes, therefore increasing the system complexity and the product cost due to an enlarged chip size.

An RF transceiver comprises a transmitter to emit wireless communications signals. Please refer to FIG. 1, which is a function block diagram of a wireless transmitter 10 according to the prior art. The basic function of the transmitter 10 is to modulate, or to decode baseband information, such as voice, video, data or other information, onto a high frequency sine wave carrier that can be radiated by a transmit antenna. The reason for this is that signals at higher frequencies can be radiated more effectively, and use the RF spectrum more efficiently, than the direct radiation of the baseband signals. The transmitter 10 comprises a first local oscillator (LO) 12 for generating a first LO signal, an I/Q modulator 14 for modulating an I/Q baseband signal with the first LO signal into an intermediate frequency (IF) signal of a frequency usually ranging from 10 to 100 MHz, a first bandpass filter 16 for passing frequency components within a narrow passband while rejecting frequency components like noises outside the passband, a second LO 18 for generating a second LO signal, a mixer 20 to up-convert the IF signal output from the first bandpass filter 16 into a sum and a difference of the IF signal and the second LO signal by mixing the IF signal with the second LO signal, a second bandpass filter 22 connected to the mixer 20 for passing the sum of the IF signal and the second LO signal only, a power amplifier 24 for increasing the power of signals output from the second bandpass filter 22, and a transmit antenna 26 for converting signals with amplified power from the power amplifier 24 to propagating electromagnetic place waves.

The first LO 12 and the second LO 18 both are made up of a PLL having a voltage-controlled oscillator installed. A feedback control circuit of the PLL enables the voltage-controlled oscillator to precisely track the phase of a stable reference oscillator. The two-staged transmitter 10, which is applied to WCDMA communications system, has advantages of reduced LO pulling, lower LO feedthrough, and milder crosstalk between I/Q channels.

An RF transceiver comprises not only a transmitter, but also a receiver. Please refer to FIG. 2, which is a function block diagram of a superheterodyne receiver 30 according to the prior art. The receiver 30 comprises an antenna 32, a third bandpass filter 34, a low noise amplifier 36 for amplifying possibly very weak received signals received by the antenna 32 while minimizing noise power that is added to the received signals, a third LO 38 for generating a third LO, a second mixer 40 to down-convert signals transmitted from the low noise amplifier 36 into an IF signal, a fourth bandpass filter 42 connected to the second mixer 40, a fourth LO 44 for generating a fourth LO, and a demodulator 46 connected to the fourth bandpass filter 42 and to the fourth LO 44 for recovering an I/Q baseband signal from signals filtered by the fourth bandpass filter 42.

According to FIG. 1 and FIG. 2, a transceiver for a cellular phone comprises four elaborate LOs.

Because of the very competitive nature of the cellular phone market, there is a strong demand to reduce the parts count, size, weight, and cost of the transmitter 10, and of the receiver 30 as well. Direct conversion transmitters, which are applied to GSM communications system, are therefore of significant interest, because the first LO 12, the first bandpass filter 16 and the second bandpass filter 22 of the transmitter 10 are eliminated here with this type of transmitter topology.

The above drawback can be overcome if a multi-mode or multi-band RF transceiver can share a single frequency synthesizer capable of generating a variety of carrier signals without impacting the quality of transmitting and receiving signals dramatically. Such an RF transceiver has a simple structure and a low cost. Please refer to FIG. 3, which is a function block diagram of a direct conversion transmitter 50 according to the prior art. A pair of I/Q signals enter a fifth bandpass filter 52 and a sixth bandpass filter 54 respectively and mix with an LO signal generated by a fifth LO (PLL) 56 for orthogonalization. The orthogonalized I/Q signals enter a power amplifier 58 for power amplification and are transmitted by a transmit antenna 60.

Despite having an advantage of comprising a minimum of components, the transmitter 50 may still suffer from a problem of LO injection pulling and must requires an additional topology for isolation. Additionally, the PLL, the mixer and the adder of the transmitter 50 have to be designed elaborately to have very low phase noise, therefore increasing the complexity to designing IC circuit and semiconductor manufacturing process.

SUMMARY OF INVENTION

It is therefore a primary objective of the claimed invention to provide a multi-mode & multi-band RF transceiver of a minimum of components and easy to be fabricated and related wireless communications method.

According to the claimed invention, the multimode communications system includes an oscillator for generating an oscillating signal by determining a control signal, the oscillating signal having a frequency corresponding to the control signal, a first frequency divider electrically connected to the oscillator for generating a compare signal by determining the oscillating signal and a dividing ratio, the compare signal having a frequency equal to a product of the frequency of the oscillating signal and the dividing ratio, and a frequency modulator electrically connected to the first frequency divider for modulating the dividing ratio, the frequency modulator capable of operating either on a modulating mode or on a constant frequency mode. When operating on the modulating mode, the frequency modulator enables the oscillating signal to have its frequency change with a variety of contents of a first communications signal by modulating the dividing ratio according to the contents of the first communications signal. When operating on the constant frequency mode, the frequency modulator enables the oscillating signal to have its frequency constant by keeping the dividing ratio unchanged. The communications system further comprises a frequency phase detector electrically connected to the first frequency divider for adjusting the control signal according to the frequency of the compare signal, a transmission module for transmitting communications signals output from the communications system, a switch capable of transmitting the oscillating signal either to the transmission module when the frequency modulator is operating on the modulating mode or to a receiving end when the frequency modulator is operating on the constant frequency mode, and a second communications module. The second communications system comprises a first mixer electrically connected to the receiving end for mixing a second communications signal with a receiving signal received by the receiving end and generating a third communications signal carried over the receiving signal.

It is an advantage of the claimed invention that a multimode communications system can be applied to a variety of communications systems with a minimum of components. These and other objectives of the present invention will no doubt become obvious to those of ordinary skill in the art after reading the following detailed description of the preferred embodiment that is illustrated in the various figures and drawings.

DETAILED DESCRIPTION

Figure 1:
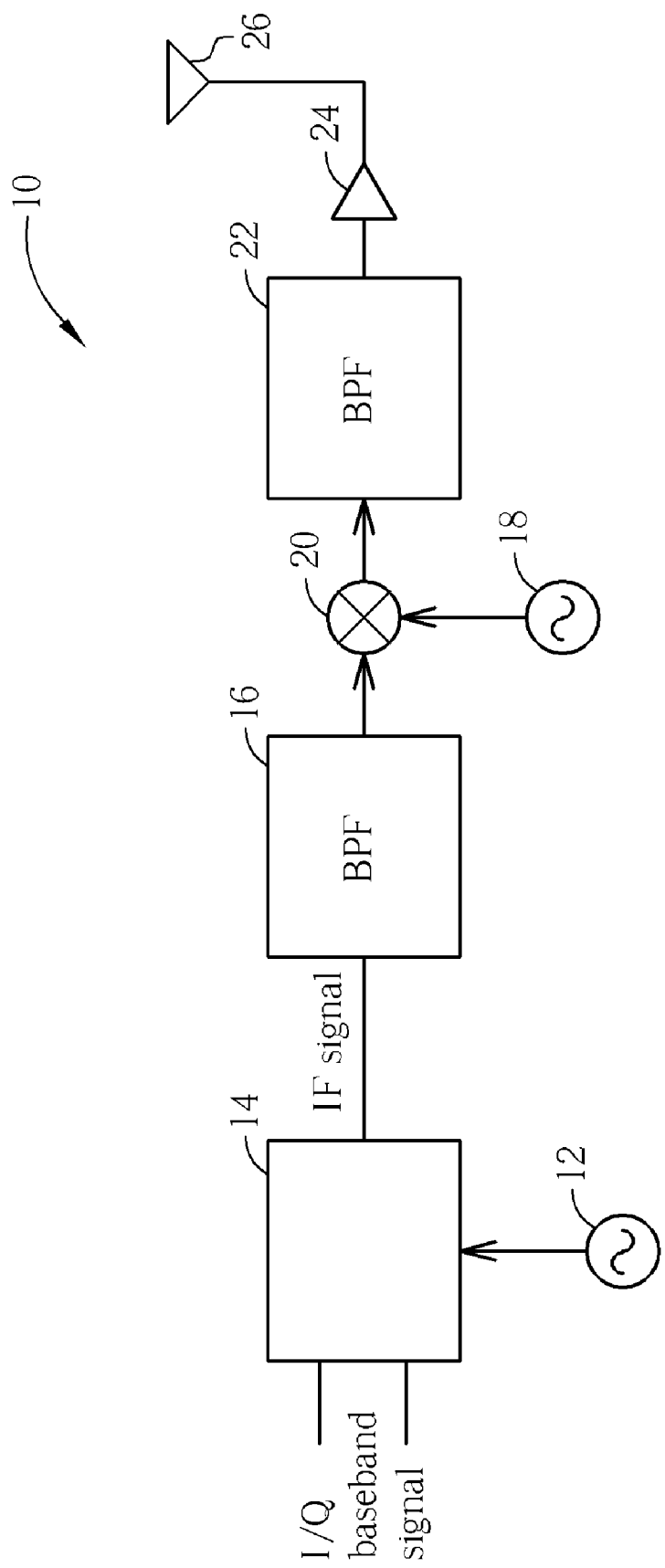
FIG. 1 is a function block diagram of a wireless transmitter according to the prior art.
Figure 2:
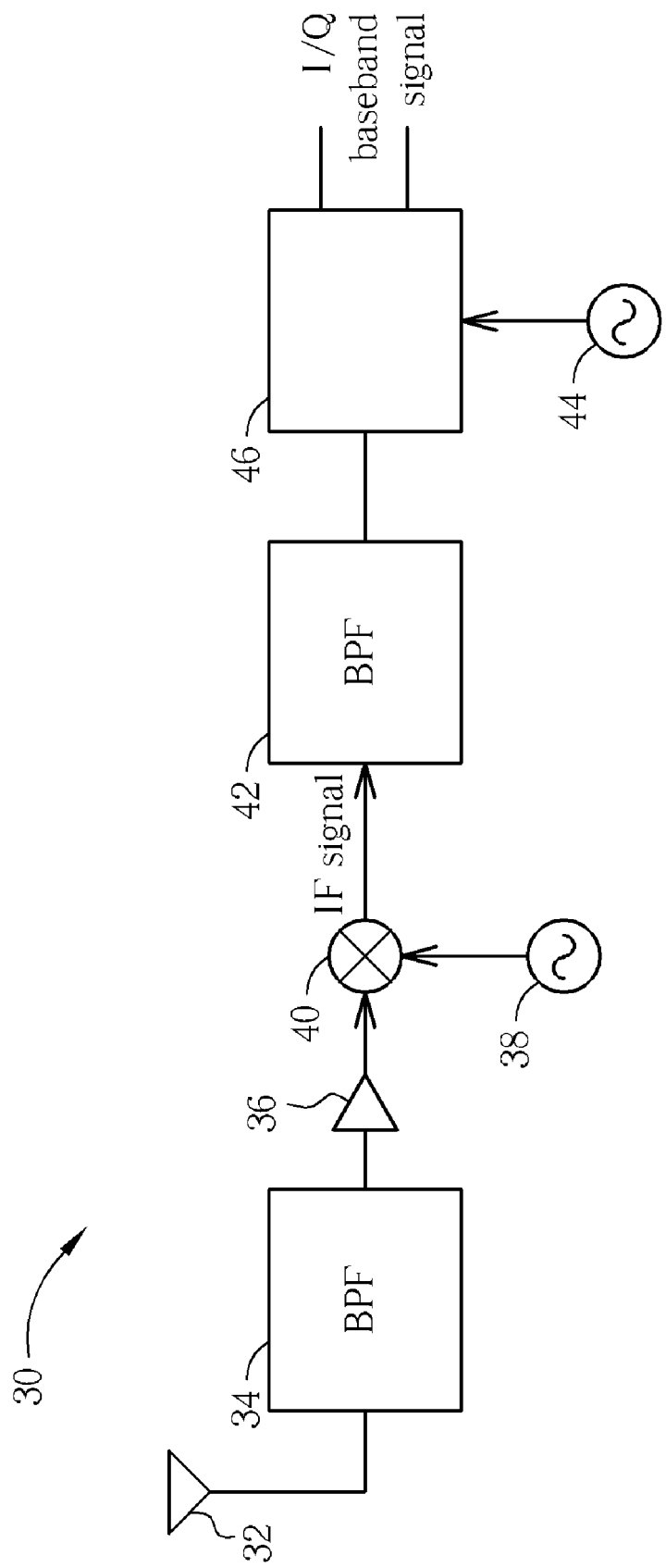
FIG. 2 is a function block diagram of a receiver according to the prior art.
Figure 3:
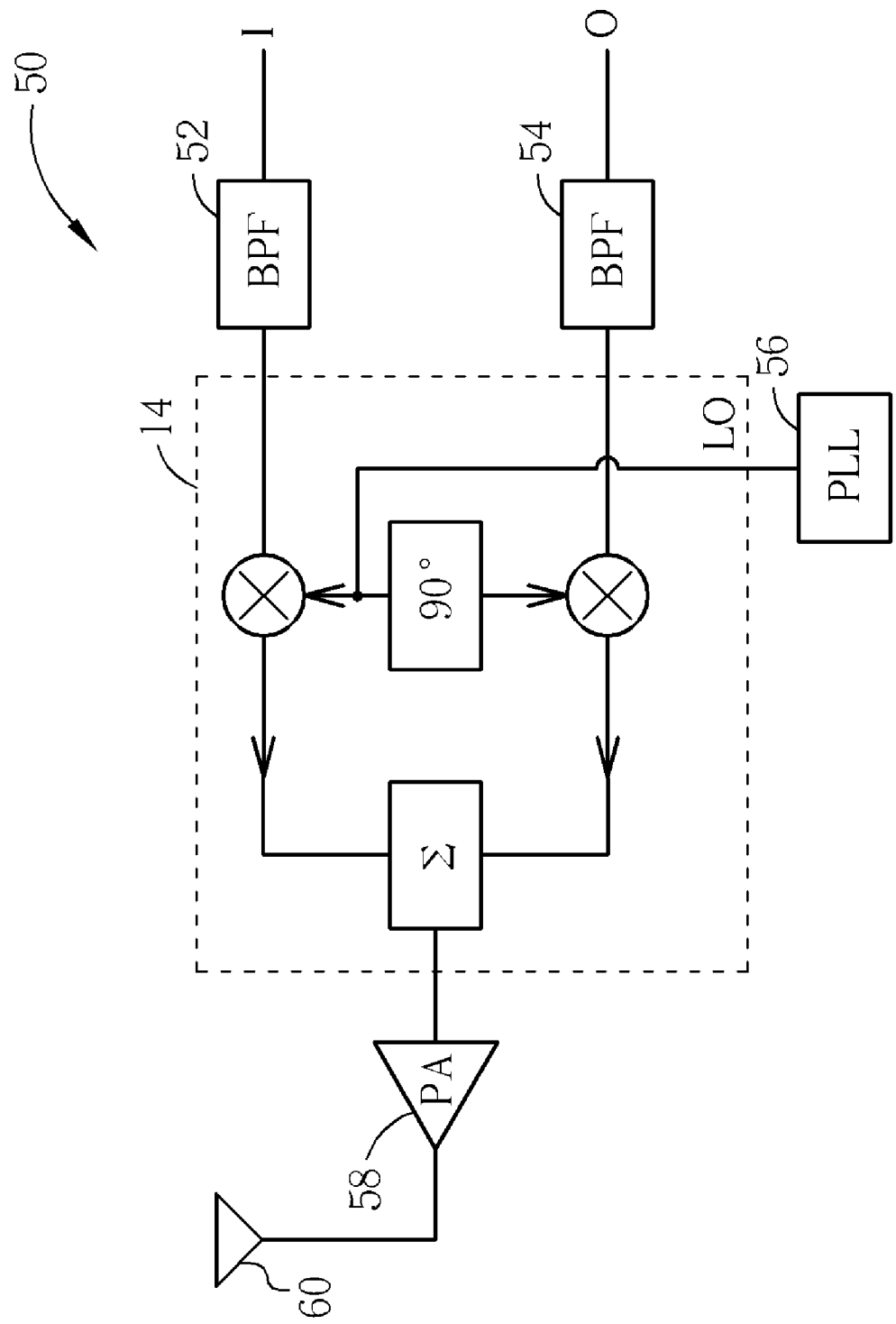
FIG. 3 is a function block diagram of a direct conversion transmitter according to the prior art.
Figure 4:
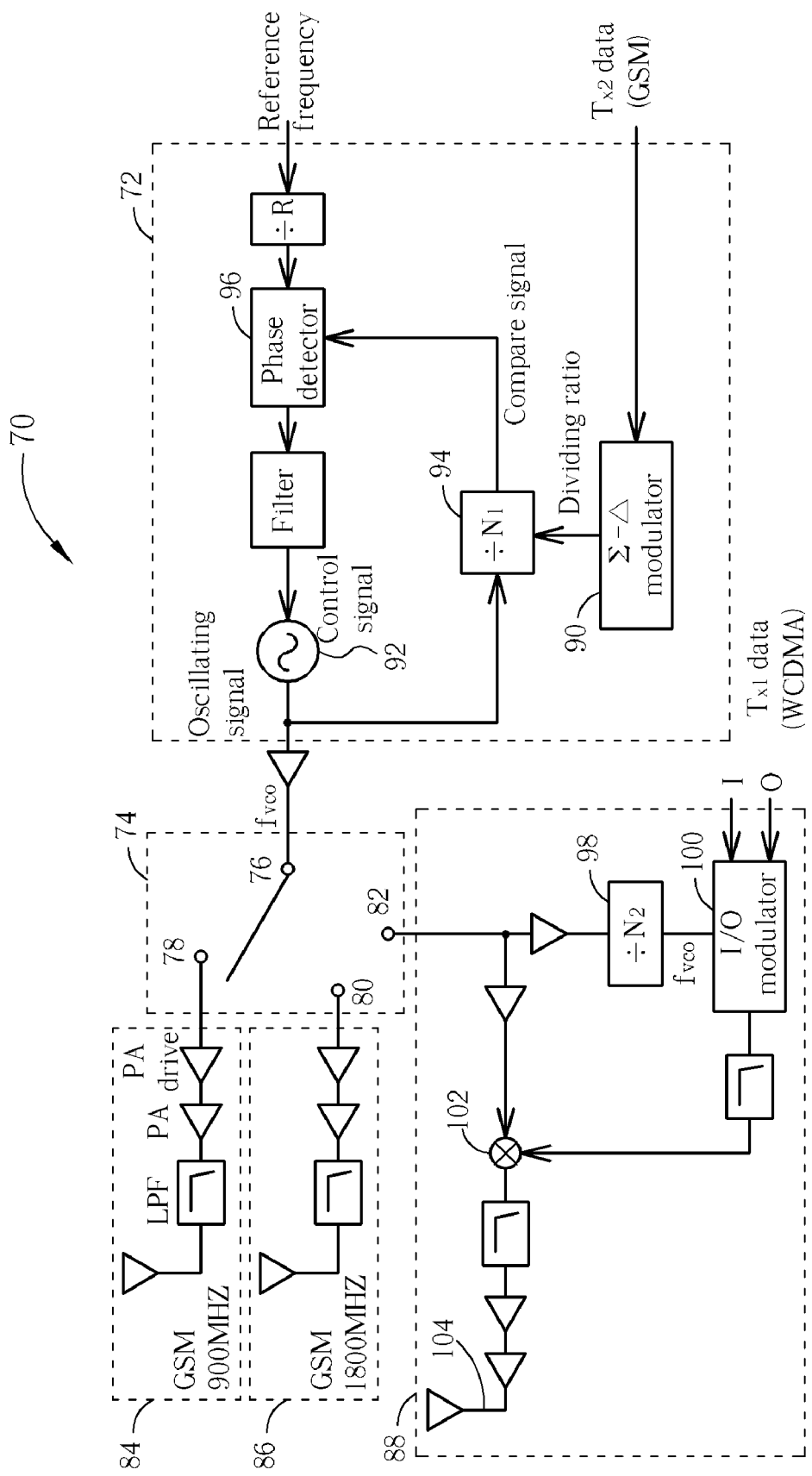
FIG. 4 is a function block diagram of an RF transmitter of the preferred embodiment according to the present invention.

Please refer to FIG. 4, which is a function block diagram of a multi-mode & multi-band RF transmitter 70 of a preferred embodiment according to the present invention. The RF transmitter 70 can be applied to a GSM, EDGE, CDMA, WCDMA, CDMA2000, and WLAN communications system etc. The transmitter 70 comprises a fractional-N frequency synthesizer 72, a first switch 74 capable of selectively connecting a transmitting end 76 electrically connected to the frequency synthesizer 72 to a first, a second, or a third receiving end 78, 80 or 82 by determining signals transmitted from the frequency synthesizer 72, a GSM-900 transmission module 84 electrically connected to the first receiving end 78, a GSM-1800 transmission module 86 electrically connected to the second receiving end 80, and a WCDMA (WLAN 802.11b or WLAN 802.11g) module 88 electrically connected to the third end 82.

The frequency synthesizer 72 is capable of selectively generating a carrier wave (CW) (local oscillator wave) having a constant frequency $f_{vco}$ for up-conversion of a first baseband signal $T_{x1}$ in a first mode, or an RF signal whose frequency is varied by the dividing ratio of the fractional-N divider 94 controlled by the sigma-delta modulator 90 according to a second baseband signal $T_{x2}$ on a second mode. The frequency synthesizer 72 comprises a voltage-controlled oscillator (VCO) 92 for generating an oscillating signal according to a control signal, the oscillating signal having a frequency corresponding to the control signal, a first fractional-N frequency divider 94 electrically connected to the VCO 92 for generating a compare signal according to the oscillating signal and to a dividing ratio, the compare signal having a frequency equal to a product of the frequency of the oscillating signal and the dividing ratio, a frequency phase detector 96 electrically connected between the first frequency divider 94 and the VCO 92 for adjusting the control signal according to the frequency of the compare signal, and the sigma-delta modulator 90, a frequency modulator, electrically connected to the first frequency divider 94 for modulating $Tx_2$ data into the dividing ratio.

The fractional-N frequency divider 94 can be implemented with an add/accumulator and selectively divides an input signal by either N or N+1 according to overflows output from the add/accumulator. Since fraction-N frequency dividers are well known in the art and therefore will not be described for further details.

The GSM-900 transmission module 84 comprises a GSM-900 antenna, a low pass filter, a power amplifier (PA), and a PA driver. The GSM-1800 transmission module 86 has a structure similar to that of the GSM-900 transmission module 84.

In FIG. 4, the WCDMA module 88 has a heterodyne structure, comprising a second frequency divider 98 for dividing signals received by the third receiving end 82, an I/Q modulator 100 for modulating $Tx_1$ data (WCDMA/EDGE), a first mixer 102 for mixing the modulated signals from the I/Q modulator 100 with the signals received by the third receiving end 82, and an antenna 104 for emitting the mixed signals.

When the RF transmitter 70 is operating on a GSM mode, the frequency synthesizer 72 is controlled to generate an RF signal according to the $Tx_2$ data input to the sigma delta modulator 90 and the first switch 74 is controlled to electrically connect the transmitting end 76 either to the first receiving end 78 or to the second receiving end 80, and in last the GSM-900 transmission module 84 or the GSM-1800 transmission module 86 emits the RF signal.

Alternatively, when the RF transmitter 70 is operating on a WCDMA mode, the frequency synthesizer 72 is controlled to generate the CW (the local oscillator wave) as the diving ratio of the fractional-N divider is a constant, and the first switch 74 is controlled to electrically connect the transmitting end 76 to the third receiving end 82. The second frequency divider 98 of the WCDMA module 88 divides the CW and generates a divided signal having a second frequency $$\frac{f_{vco}}{N_2}.$$

The modulator 100 modulates the $Tx_1$ data with the divided signal and generates a modulated signal, an IF signal. The first mixer 102 mixes the modulated signal with the CW having the first frequency $f_{vco}$, and generates two mixed RF signals having two kinds of frequencies, $$f_{vco} \pm \frac{f_{vco}}{N_2}.$$

Finally, the antenna 104 emits one of the two mixed RF signals.

The related communications method according to the present invention comprises the following steps: (a) generating a RF signal by the fractional-N frequency synthesizer 72 whose dividing ratio is controlled according to the $Tx_2$ data and emitting the RF signal when on the GSM mode; (b) generating a CW tone having a constant frequency since the dividing ratio of the fractional-N frequency synthesizer 72 is kept as a constant when on the WCDMA mode; (c) mixing the divided signal generated by the second frequency divider 98 with the modulated signal generated by the I/Q modulator 100 according to the $Tx_1$ data and directly up-converting the $Tx_1$ signal into the mixed signal having the frequencies of $$f_{vco} \pm \frac{f_{vco}}{N_2};$$

and (d) emitting the mixed signal with the antenna 104.

Figure 5:
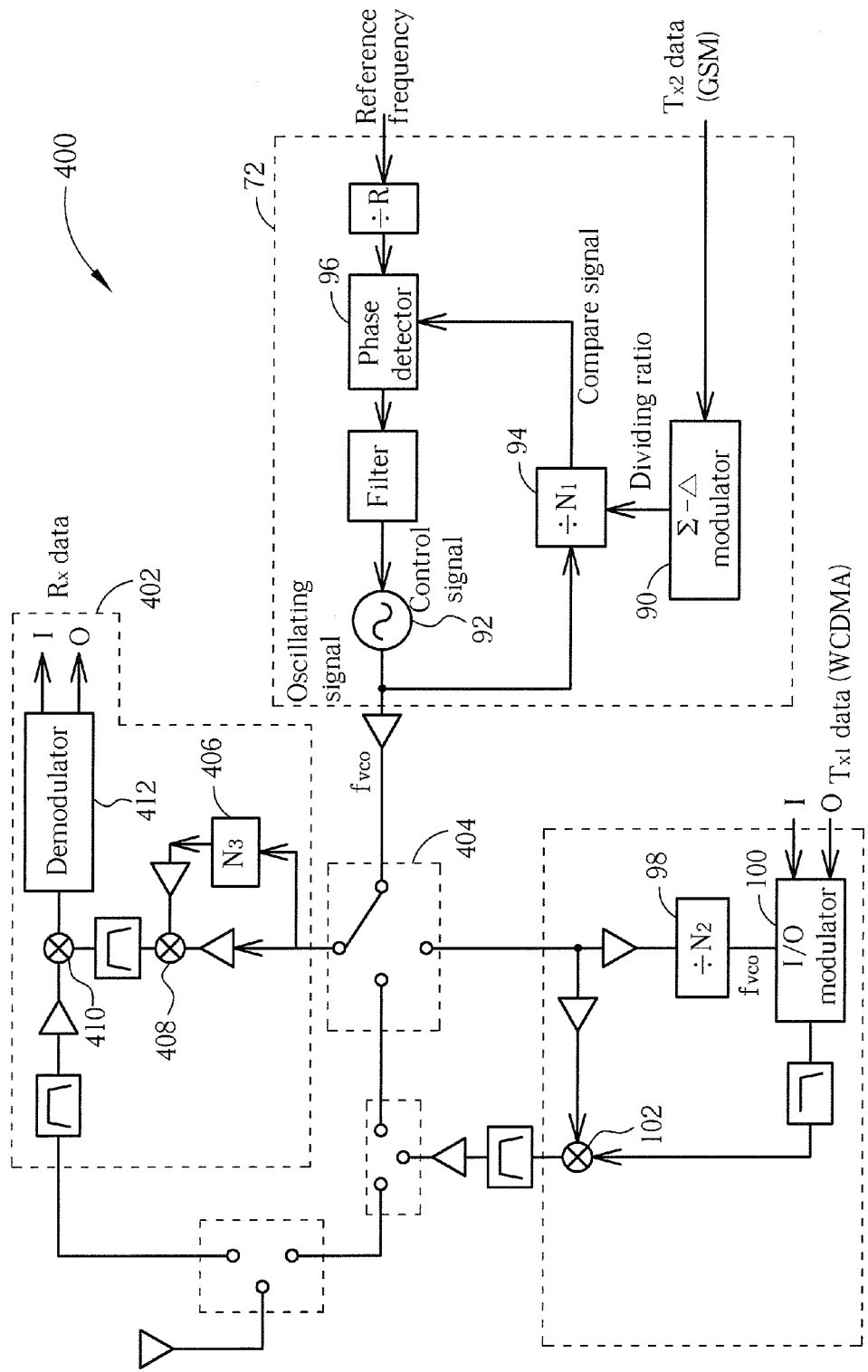
FIG. 5 is a function block diagram of an RF transceiver of a second embodiment according to the present invention.

A transceiver comprises both a transmitter and a receiver. Please refer to FIG. 5, which is an RF transceiver 400 of a second embodiment according to the present invention. The RF transceiver 400 can be operating on the GSM mode to transmit/receive data asynchronously or operating on the WCDMA mode to transmit/receive data synchronously.

In addition to the frequency synthesizer 72 and the WCDMA module 88, the transceiver 400 further comprises an RF receiving module 402. When the transceiver 400 is controlled to operate on the WCDMA mode, a second switch 404 connects the frequency synthesizer 72 to the WCDMA module 88 and to the RF receiving module 402 concurrently, and the CW tone having the first frequency $f_{vco}$ from the frequency synthesizer 72 can be used by the WCDMA module 88 and by the RF receiving module 402. Please note that the transceiver 400 comprises only one LO.

The RF receiving module 402 comprises a third frequency divider 406 for dividing a CW (an local oscillator wave) and for generating a divided CW, a second mixer 408 for mixing the CW tone with the divided CW tone and for generating a mixed signal, a third mixer 410 for down-converting a wireless signal received by the antenna 104, and a demodulator 412 for demodulating the down-converted signal into an I/Q signal.

The RF receiving module 402 may also serve as a GSM receiver. On a GSM receiving mode, the second switch 404 connects the frequency synthesizer 72 with the RF receiving module 402 that provides a local oscillator wave since its dividing ratio is kept as a constant. The RF receiving module 402 therefore down-converts an incoming RF signal according to the local oscillator wave.

Figure 6:
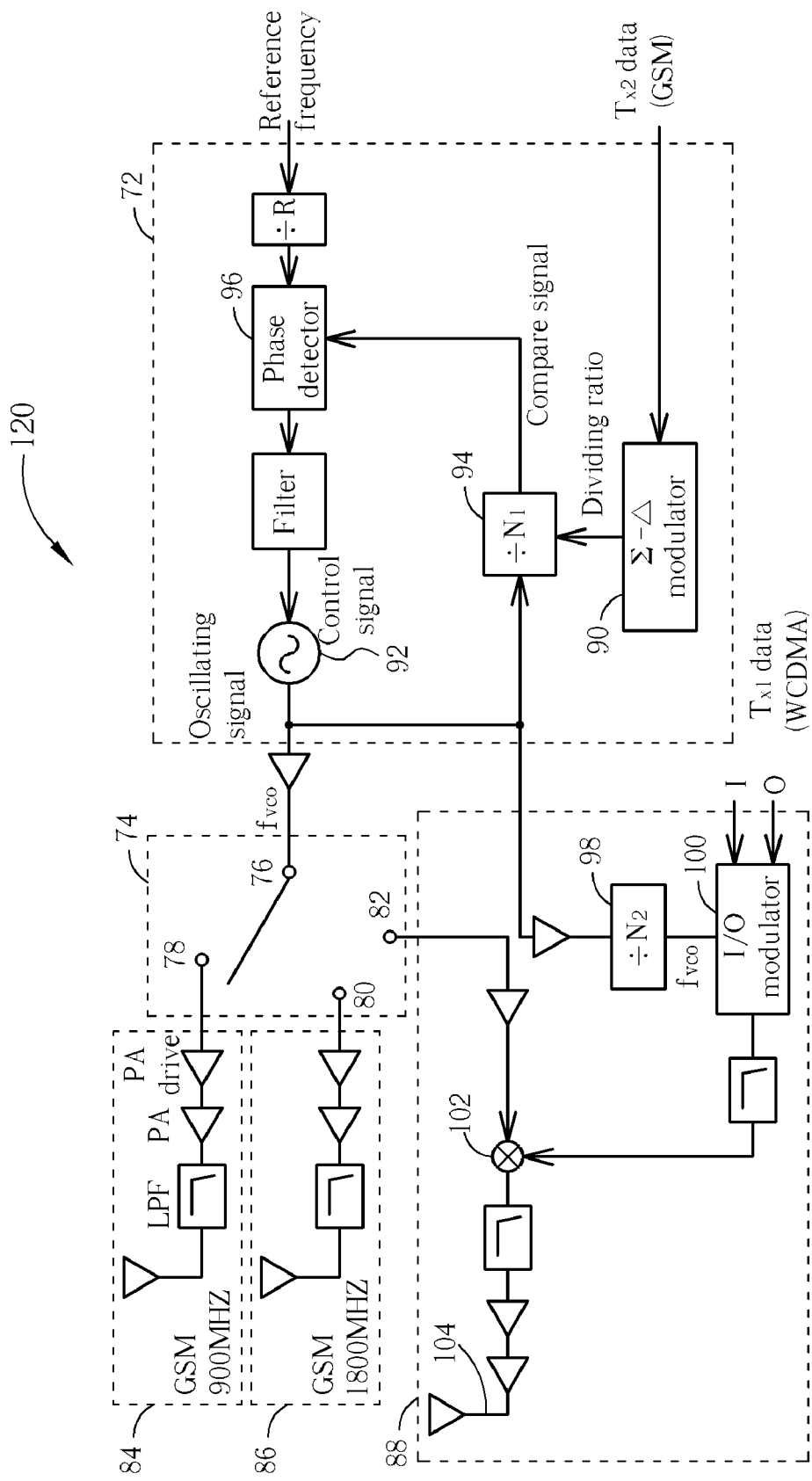
FIG. 6 is a function block diagram of an RF transmitter of a third embodiment according to the present invention.

The second frequency divider 98 of the WCDMA module 88 of the transmitter 70 shown in FIG. 4 can be alternatively electrically connected to the frequency synthesizer 72 directly rather than to the third receiving end 82 of the first switch 74, as shown in FIG. 6, which is a function block diagram of an RF transmitter 120 of a third embodiment according to the present invention. The transmitter 120 has a structure similar to that of the transmitter 70 shown in FIG. 4 except that the second frequency divider 98 is electrically connected to the frequency synthesizer 72 directly rather than to the third receiving end 82 of the first switch 74, as does the third frequency divider 110 of the communications system 70.

Figure 7:
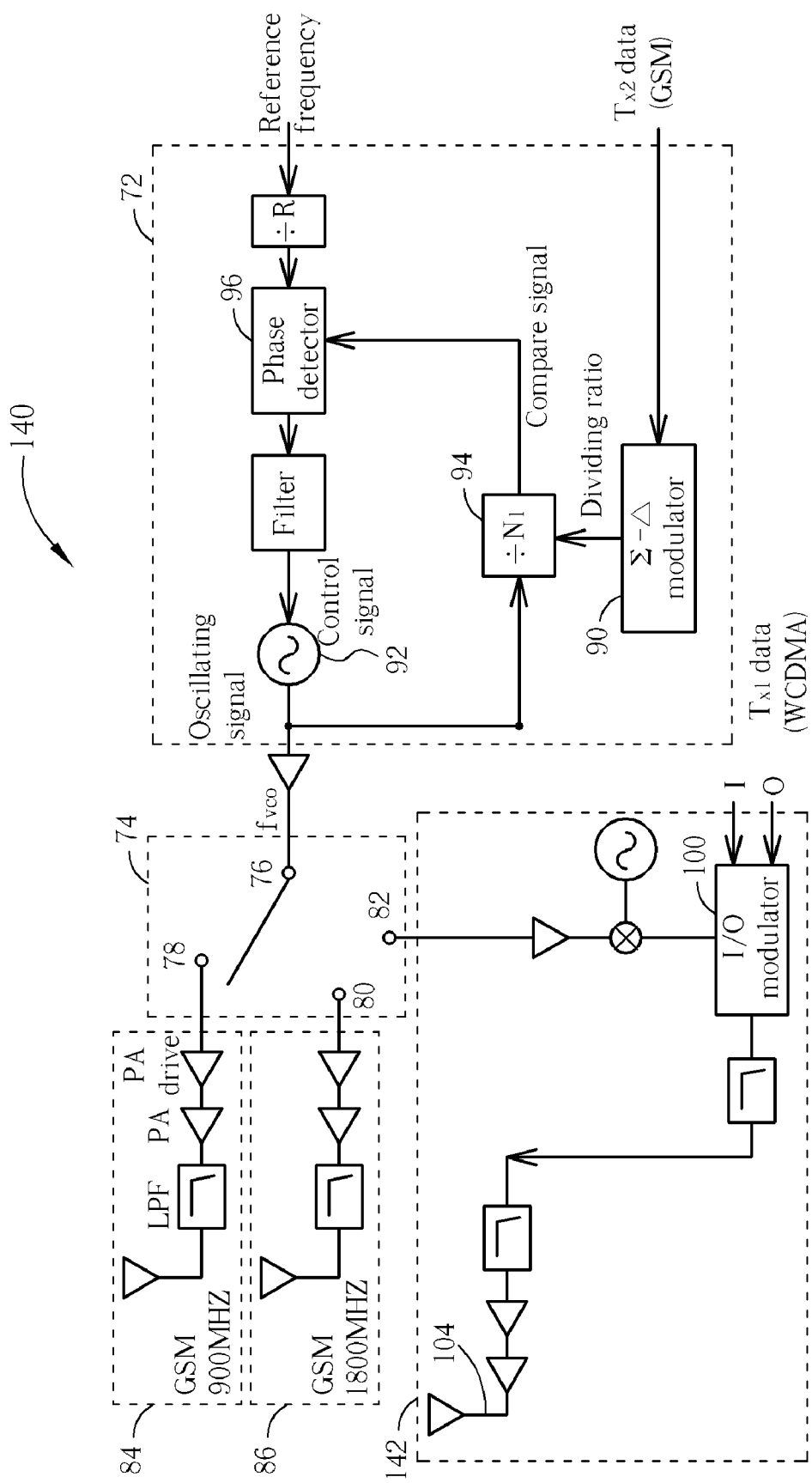
FIG. 7 is a function block diagram of an RF transmitter of a fourth embodiment according to the present invention.

Please refer to FIG. 7, which is a function block diagram of an RF transmitter 140 of a fourth embodiment according to the present invention and has a homodyne structure. The transmitter 140 also has a structure similar to that of the transmitter 70 except that a WCDMA module 142 of the transmitter 140 comprises a mixer mixing the CW from the frequency synthesizer 72 with another CW to generate a further CW utilized by the I/O modulator 100.

In contrast to the prior art, the present invention can provide a multi-mode & multi-band RF transceiver and related wireless communications method capable of operating on dual modes (GSM/EDGE & WCDMA/WLAN 802.11b & 11g) as well as on multiple bands (GSM 900 & 1,800) with a fractional-N frequency synthesizer consisting of only one LO, therefore reducing the system complexity and the cost to manufacture an integrated circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multimode communications method comprising:
   generating an oscillating signal by determining a control signal, the oscillating signal having a frequency corresponding the control signal;
   generating a compare signal according to the oscillating signal and a dividing ratio, the compare signal having a frequency equal to a product of the frequency of the oscillating signal and the dividing ratio;
   modulating the dividing ratio and selectively enabling the oscillating signal to have its frequency change with a variety of contents of a first communications signal on a modulating mode by modulating the dividing ratio according to the contents of the first communications signal and enabling the oscillating signal to have its frequency constant on a constant frequency mode by keeping the dividing ratio unchanged in a constant frequency mode;
   adjusting the control signal according to the frequency of the compare signal; selectively transmitting the oscillating signal either to a transmission module when operating on the modulating mode or to a receiving end when operating on the constant frequency mode; and
   mixing a receiving signal received by the receiving end with a second communications signal and generating a third communications signal carried over the receiving signal.

2. The method of claim 1 further comprising:
   dividing the oscillating signal transmitted to the receiving end.

3. The method of claim 1 further comprising:
   receiving communications signals, the second communications signal being a communications signal among the received communications signals.

4. The method of claim 3, wherein the received communications signals are received wirelessly.

5. The method of claim 3 further comprising:
   generating a constant frequency signal having a constant frequency; and mixing a communications signal among the communications signals with the constant frequency signal.

6. The method of claim 1 further comprising:
wirelessly transmitting communications signals.

7. A multimode communications system comprising:
a first communications module comprising:
  an oscillator for generating an oscillating signal by determining a control signal, the oscillating signal having a frequency corresponding to the control signal;
  a first frequency divider electrically connected to the oscillator for generating a compare signal according to the oscillating signal and a dividing ratio, the compare signal having a frequency equal to a product of the frequency of oscillating signal and the dividing ratio;
  a frequency modulator electrically connected to the first frequency divider for modulating the dividing ratio, the frequency modulator selectively operating either on a modulating mode and enabling the oscillating signal to have its frequency change with a variety of contents of a first communications signal by modulating the dividing ratio according to the contents of the first communications signal or on a constant frequency mode and enabling the oscillating signal to have its frequency constant by keeping the dividing ratio unchanged; and
  an frequency phase detector electrically connected to the first frequency divider and the oscillator for adjusting the control signal according to the frequency of the compare signal;
a transmission module for transmitting communications signals ready to be output from the communications system;
a switch capable of selectively transmitting the oscillating signal either to the transmission module when the frequency modulator is operating on the modulating mode or to a receiving end when the frequency modulator is operating on the constant frequency mode; and
a second communications module comprising:
  a first mixer electrically connected to the receiving end for mixing a second communications signal with a receiving signal received by the receiving end and generating a third communications signal carried over the receiving signal.

8. The communications system of claim 7, wherein the second communications module further comprises a second frequency divider electrically connected between the receiving end and the switch for dividing the frequency of the oscillating signal transmitted from the switch to the receiving end.

9. The communications system of claim 7 further comprising a receiving module for receiving communications signals transmitted to the communications system, the second communications signal being one of the communications signals received by the receiving module.

10. The communications system of claim 9, wherein the receiving module is capable of receiving communications signals wirelessly transmitted to the communications system.

11. The communications system of claim 9 further comprising:
a third communications module comprising:
  a local oscillator for generating a constant frequency signal having a constant frequency; and
  a third mixer for mixing a communications signal received by the receiving module with the constant frequency signal.

12. The communications system of claim 7, wherein the transmission module is capable of wirelessly transmitting communications signals from the communications system.

* * * * *